United States Patent
Xu et al.

(10) Patent No.: US 8,150,836 B2
(45) Date of Patent: Apr. 3, 2012

(54) SYSTEM, METHOD, AND COMPUTER-READABLE MEDIUM FOR REDUCING ROW REDISTRIBUTION COSTS FOR PARALLEL JOIN OPERATIONS

(75) Inventors: Yu Xu, San Diego, CA (US); Olli Pekka Kostamaa, Santa Monica, CA (US); Xin Zhou, Monterey Park, CA (US)

(73) Assignee: Teradata US, Inc., Dayton, OH (US)

( * ) Notice: Subject to any disclaimer, the term of this patent is extended or adjusted under 35 U.S.C. 154(b) by 866 days.

(21) Appl. No.: 12/193,814

(22) Filed: Aug. 19, 2008

(65) Prior Publication Data

US 2010/0049722 A1    Feb. 25, 2010

(51) Int. Cl.
*G06F 17/30* (2006.01)

(52) U.S. Cl. ............ 707/714; 707/713; 706/12; 706/14; 706/19; 706/21; 706/45

(58) Field of Classification Search ........................ None
See application file for complete search history.

(56) References Cited

U.S. PATENT DOCUMENTS

| | | | | |
|---|---|---|---|---|
| 5,864,842 A | * | 1/1999 | Pederson et al. | 1/1 |
| 5,978,793 A | * | 11/1999 | Kashyap et al. | 1/1 |
| 5,987,468 A | * | 11/1999 | Singh et al. | 1/1 |
| 6,003,036 A | * | 12/1999 | Martin | 1/1 |
| 6,081,801 A | * | 6/2000 | Cochrane et al. | 1/1 |
| 6,704,724 B1 | * | 3/2004 | Ellmann et al. | 707/718 |
| 6,745,198 B1 | * | 6/2004 | Luo et al. | 1/1 |
| 7,054,852 B1 | * | 5/2006 | Cohen | 1/1 |
| 7,085,769 B1 | * | 8/2006 | Luo et al. | 1/1 |
| 7,386,561 B1 | * | 6/2008 | Ramesh et al. | 1/1 |
| 7,640,255 B2 | * | 12/2009 | Brookler | 1/1 |
| 2003/0078909 A1 | * | 4/2003 | Pham et al. | 707/1 |
| 2004/0215639 A1 | * | 10/2004 | Bamford et al. | 707/100 |
| 2005/0091238 A1 | * | 4/2005 | Zane et al. | 707/100 |
| 2009/0024568 A1 | * | 1/2009 | Al-Omari et al. | 707/2 |

OTHER PUBLICATIONS

A.J. Hildenbrand, "Math 408, Actuarial Statistics I", Spring 2008.*

* cited by examiner

*Primary Examiner* — Hung Le
(74) *Attorney, Agent, or Firm* — Steve McDonald; Randy Campbell

(57) ABSTRACT

A system, method, and computer-readable medium for optimizing execution of a join operation in a parallel processing system are provided. A plurality of processing nodes that have at least one row of one or more tables involved in a join operation are identified. For each of the processing nodes, respective counts of rows that would be redistributed to each of the processing nodes based on join attributes of the rows are determined. A redistribution matrix is calculated from the counts of rows of each of the processing nodes. An optimized redistribution matrix is generated from the redistribution matrix, wherein the optimized redistribution matrix provides a minimization of rows to be redistributed among the nodes to execute the join operation.

20 Claims, 6 Drawing Sheets

400 ⟶

| Redistribution Matrix T | To Node$_j$ | | |
|---|---|---|---|
| From Node$_i$ | Node 1 | Node 2 | Node 3 |
| Node 1 | 1000 | 2000 | 3000 |
| Node 2 | 3000 | 1000 | 2000 |
| Node 3 | 2000 | 3000 | 1000 |

500 ⟶

| Optimized Redistribution Matrix T' | To Node$_j$ | | |
|---|---|---|---|
| From Node$_i$ | Node 1 | Node 2 | Node 3 |
| Node 1 | 3000 | 1000 | 2000 |
| Node 2 | 2000 | 3000 | 1000 |
| Node 3 | 1000 | 2000 | 3000 |

| Redistribution Matrix T | To Node$_j$ | | |
|---|---|---|---|
| From Node$_i$ | Node 1 | Node 2 | Node 3 |
| Node 1 | 1000 | 2000 | 3000 |
| Node 2 | 3000 | 1000 | 2000 |
| Node 3 | 2000 | 3000 | 1000 |

Figure 4

| Optimized Redistribution Matrix T' | To Node$_j$ | | |
|---|---|---|---|
| From Node$_i$ | Node 1 | Node 2 | Node 3 |
| Node 1 | 3000 | 1000 | 2000 |
| Node 2 | 2000 | 3000 | 1000 |
| Node 3 | 1000 | 2000 | 3000 |

SYSTEM, METHOD, AND COMPUTER-READABLE MEDIUM FOR REDUCING ROW REDISTRIBUTION COSTS FOR PARALLEL JOIN OPERATIONS

BACKGROUND

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

One of the goals of a database management system is to optimize the performance of queries for access and manipulation of data stored in the database. Given a target environment, an optimal query plan is selected, with the optimal query plan being the one with the lowest cost (e.g., response time) as determined by an optimizer. The response time is the amount of time it takes to complete the execution of a query on a given system.

In massively parallel processing (MPP) systems, the processing costs for performing parallel joins can become undesirable. As is understood, a join comprises a structured query language (SQL) operation that combines records from two or more tables. Efficient parallel joins are critical to the performance of parallel database systems.

Consider a frequently used mechanism for executing a parallel join on two relations R and S on R.a and S.b (where "a" and "b" are respective columns of the relations R and S). Assume neither relation R nor S has been partitioned by its respective join attribute. A relation may be divided among a plurality of processing modules in the MPP system. Such a mechanism is referred to herein as partitioning. Typically, a relation is partitioned on a primary index, e.g., one or more columns by hashing the rows on the primary index and distributing the rows to a particular processing module based on the primary index hash value. First, rows from R and S are redistributed according to a hash value on the respective join attribute "a" and "b" so that rows from R and S that match on R.a=S.b are redistributed to common processing modules. Each processing module then joins the rows of R and S that have been hash redistributed to the processing module.

In conventional parallel DBMSs, rows are statically redistributed to processing modules based on a pre-configured hash value-to-processing module mapping table. In practice, often the hash value-to-processing module mapping is done in two steps: a prefix of the hash value (for example, the first half bits of the hash value) is taken to map the hash value to an integer referred to as a hash bucket, and then the hash bucket is mapped to a particular processing module. Thus, rows are redistributed to processing modules solely on the hash value and regardless of the number of rows that are redistributed across the system. Sometimes, such a mechanism results in a high processing cost that disadvantageously impacts the overall processing efficiency.

SUMMARY

Disclosed embodiments provide a system, method, and computer readable medium for optimizing the row redistribution cost in the execution of a join operation in a parallel processing system. A plurality of processing nodes that have at least one row of one or more tables involved in a join operation are identified. For each of the processing nodes, respective counts of rows that would be redistributed to each of the processing nodes based on join attributes of the rows are determined. A redistribution matrix is calculated from the counts of rows of each of the processing nodes. An optimized redistribution matrix is generated from the redistribution matrix, wherein the optimized redistribution matrix provides a minimization of rows to be redistributed among the nodes to execute the join operation.

BRIEF DESCRIPTION OF THE DRAWINGS

Aspects of the present disclosure are best understood from the following detailed description when read with the accompanying figures, in which:

FIG. 4 depicts a diagrammatic representation of an exemplary redistribution matrix;

FIG. 5 depicts a diagrammatic representation of an exemplary optimized redistribution matrix generated in accordance with an embodiment;

DETAILED DESCRIPTION

It is to be understood that the following disclosure provides many different embodiments or examples for implementing different features of various embodiments. Specific examples of components and arrangements are described below to simplify the present disclosure. These are, of course, merely examples and are not intended to be limiting.

A system, method, and computer-readable medium for optimizing the row redistribution cost in the execution of a join operation in a parallel processing system are provided. A plurality of processing nodes that have at least one row of one or more tables involved in a join operation are identified. For each of the processing nodes, respective counts of rows that would be redistributed to each of the processing nodes based on join attributes of the rows are determined. A redistribution matrix is calculated from the counts of rows of each of the processing nodes. An optimized redistribution matrix is generated from the redistribution matrix, wherein the optimized redistribution matrix provides a minimization of rows to be redistributed among the nodes to execute the join operation.

Figure 1:
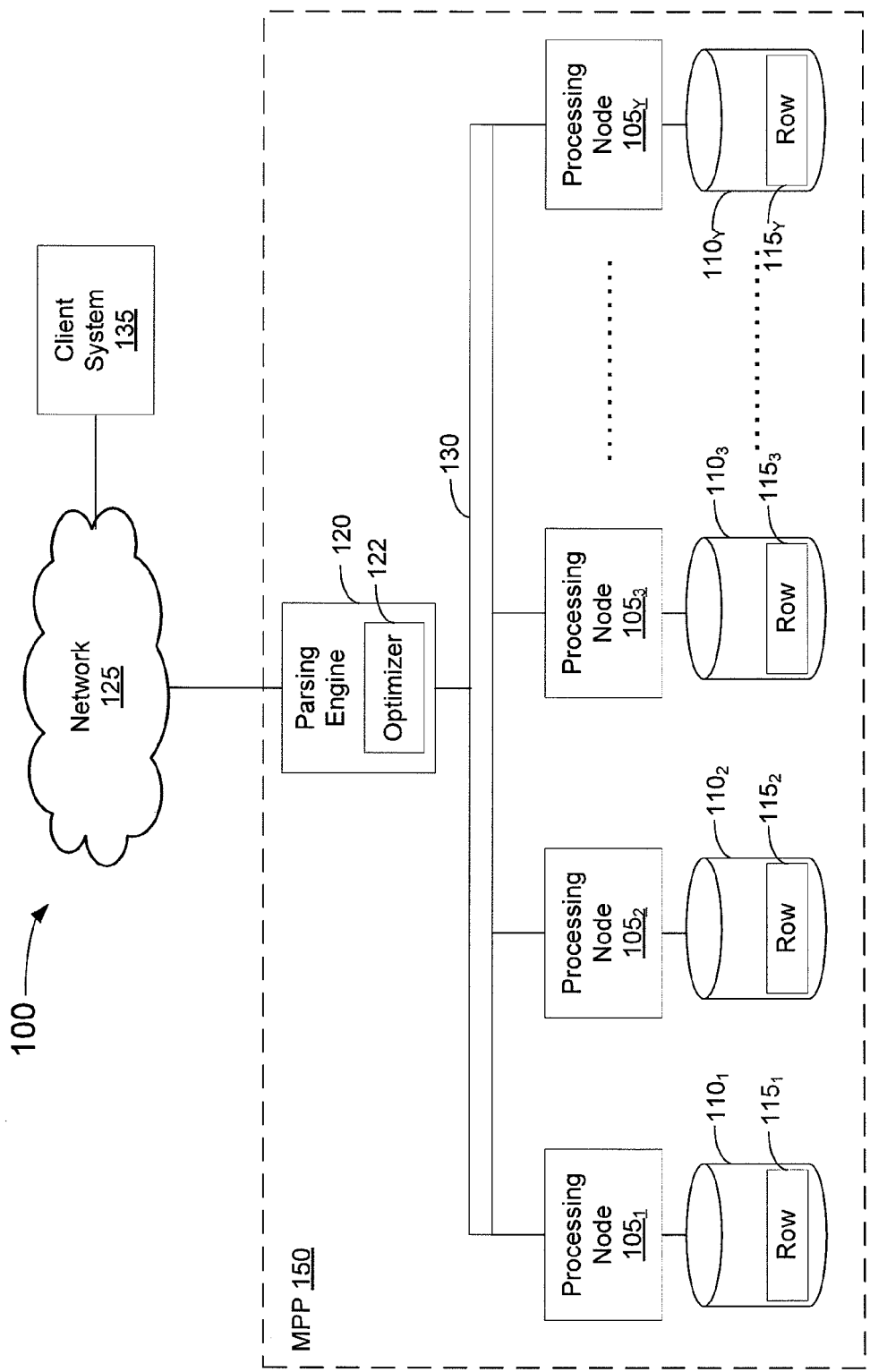
FIG. 1 depicts a diagrammatic representation of an exemplary architecture for a large database system that is suited for implementing a hash redistribution mechanism for reducing the processing costs of a parallel join operation in accordance with disclosed embodiments.

FIG. 1 depicts a diagrammatic representation of an exemplary architecture for a large database system 100, such as a Teradata Active Data Warehousing System, that is suited for implementing a hash redistribution mechanism for reducing the processing costs of a parallel join operation in accordance with disclosed embodiments. The database system 100 includes a relational database management system (RDBMS) built upon a massively parallel processing (MPP) system 150.

As shown, the database system 100 includes one or more processing nodes $105_1 \ldots _Y$ that manage the storage and retrieval of data in data-storage facilities $110_1 \ldots _Y$. Each of the processing nodes may host one or more physical or virtual processing modules, such as one or more access module processors (AMPs). Each of the processing nodes $105_1 \ldots _Y$ manages a portion of a database that is stored in a corresponding one of the data-storage facilities $110_1 \ldots _Y$. Each of the data-storage facilities $110_1 \ldots _Y$ includes one or more disk drives or other storage medium.

The system stores data in one or more tables in the data-storage facilities $110_1 \ldots _Y$. The rows $115_1 \ldots _Y$ of the tables are stored across multiple data-storage facilities $110_1 \ldots _Y$ to ensure that the system workload is distributed evenly across the processing nodes $105_1 \ldots _Y$. A parsing engine 120 organizes the storage of data and the distribution of table rows $115_1 \ldots _Y$ among the processing nodes $105_1 \ldots _Y$ and accesses processing nodes $105_1 \ldots _Y$ via an interconnect 130. The parsing engine 120 also coordinates the retrieval of data from the data-storage facilities $110_1 \ldots _Y$ in response to queries received from a user, such as one using a client computer system 135 connected to the database system 100 through a network 125 connection. The parsing engine 120, on receiving an incoming database query, applies an optimizer 122 component to the query to assess the best plan for execution of the query. Selecting the optimal query-execution plan includes, among other things, identifying which of the processing nodes $105_1 \ldots _Y$ are involved in executing the query and which database tables are involved in the query, as well as choosing which data-manipulation techniques will serve best in satisfying the conditions of the query. Database statistics are used in making these assessments during construction of the query-execution plan. For example, database statistics may be used by the optimizer to determine data demographics, such as attribute minimum and maximum values and data ranges of the database. The database system typically receives queries in a standard format, such as the Structured Query Language (SQL) put forth by the American National Standards Institute (ANSI).

Figure 2:
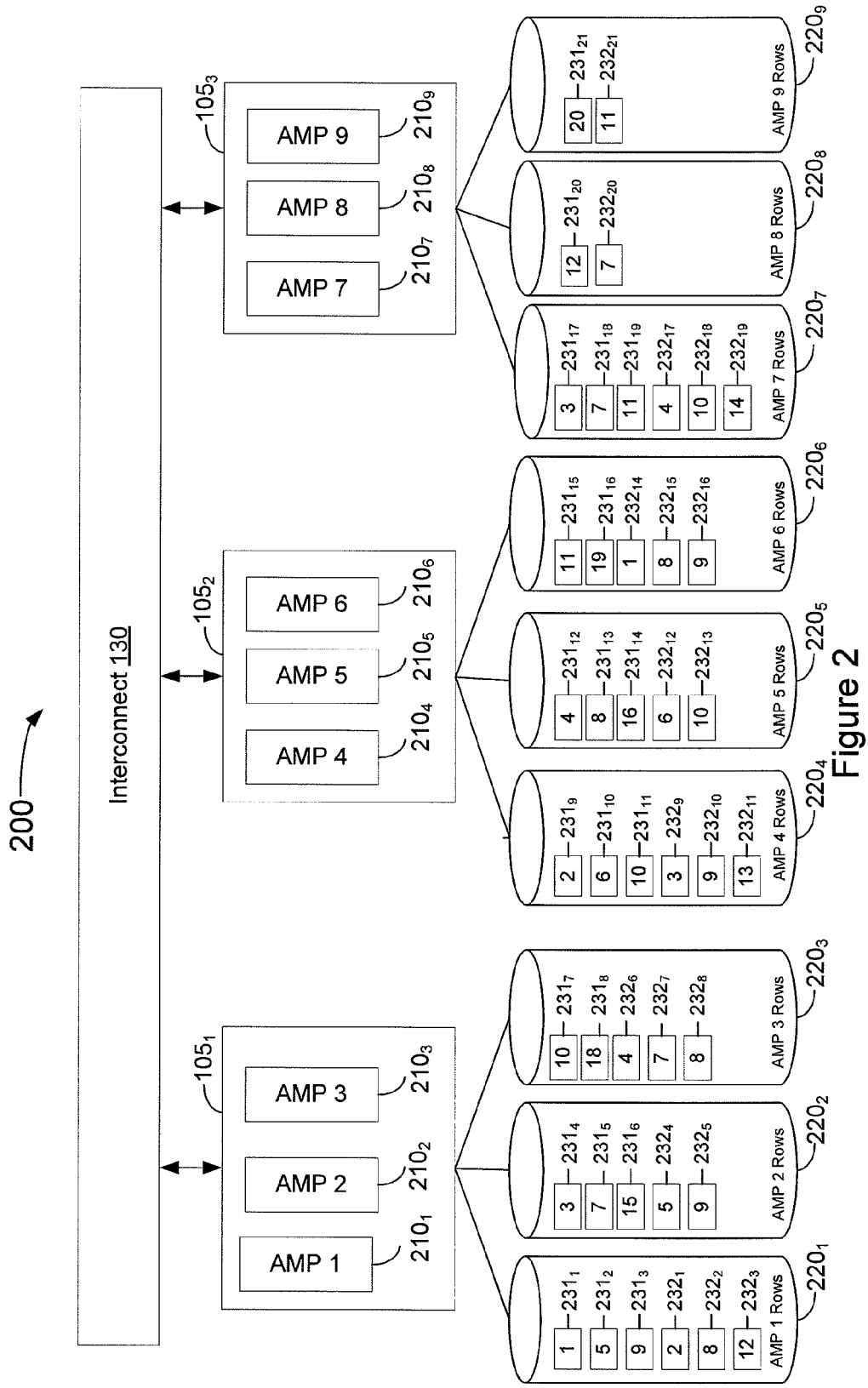
FIG. 2 is a diagrammatic representation of a massively parallel processing configuration in which a table redistribution may be performed to facilitate execution of a parallel join.

FIG. 2 is a diagrammatic representation of an MPP configuration 200 in which a table redistribution may be performed to facilitate execution of a parallel join. In the illustrative example, assume the rows of two tables have been distributed across nine AMPs $210_1$-$210_9$ or other processing modules hosted by the processing nodes $105_1$-$105_3$ such that each of the AMPs is allocated rows $220_1$-$220_9$. Consider a join operation to be executed that is specified by the following:

Select * from TableR, TableS where TableR.a=TableS.b

Figure 3:
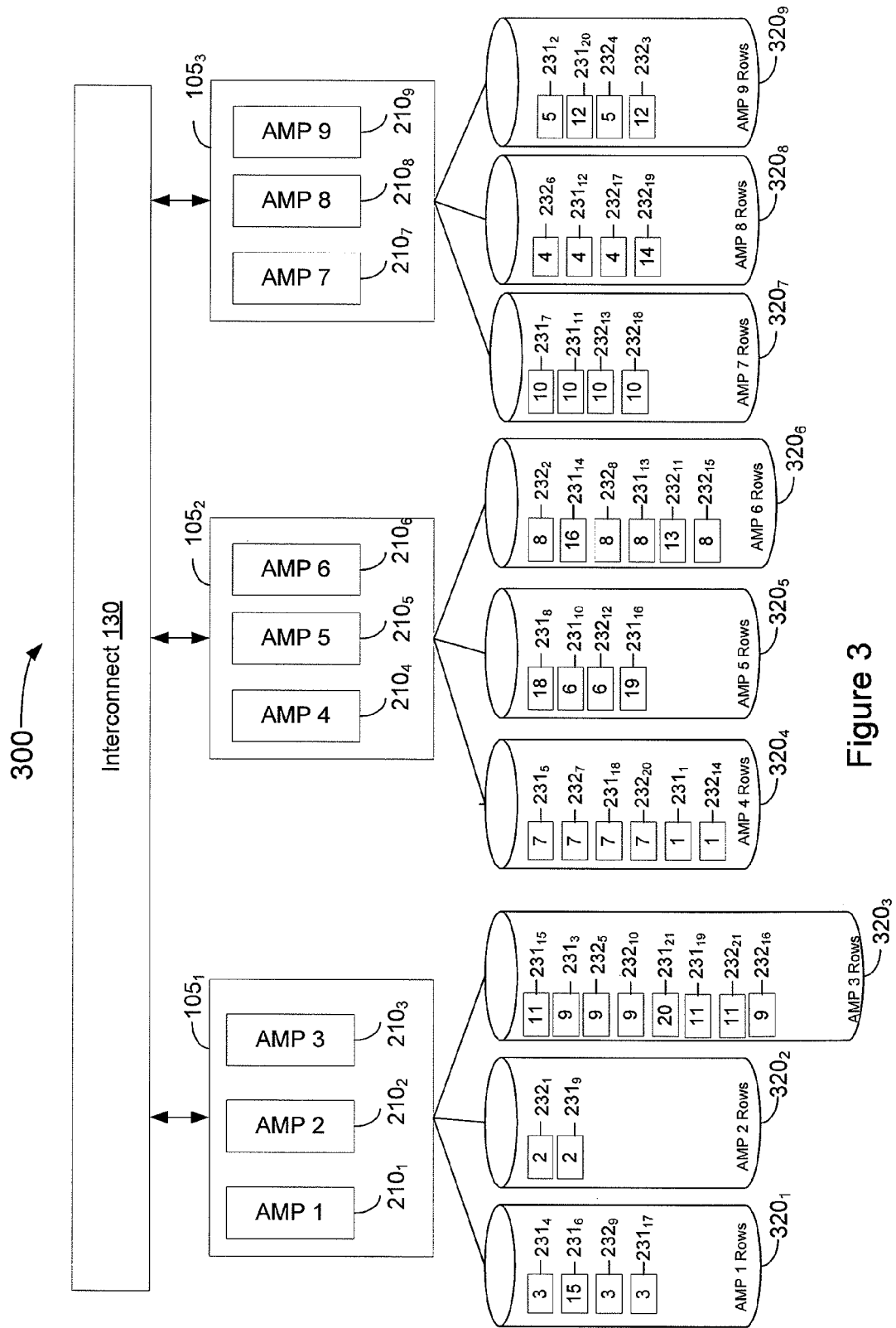
FIG. 3 depicts a diagrammatic representation of a redistribution of the table rows depicted in FIG. 2 that facilitates execution of the join operation.

In the present example, column a elements of TableR are designated $231_1$-$231_{21}$ and column b elements of TableS are designed $232_1$-$232_{21}$. Assume that the rows of TableR and TableS are distributed among AMPs $210_1$-$210_9$ via a hash of primary indexes of TableR and TableS and that the primary indexes are neither column a of TableR nor column b of TableS. In this situation, the rows may be redistributed by hashing the join columns TableR.a and TableS.b and redistributing the rows based on the hash values such that rows from TableR and TableS that match on the join columns TableR.a and TableS.b are redistributed to the same processing modules or AMPs. For example, FIG. 3 depicts a diagrammatic representation 300 of a redistribution of the table rows $220_1$-$220_9$ that facilitates execution of the join operation. Each AMP $210_1$-$210_9$ hashes the rows $220_1$-$220_9$ originally distributed thereto on the rows' join columns and redistributes the rows according to the hash values. Accordingly, the AMPs $210_1$-$210_9$ respectively receive redistributed rows $320_1$-$320_9$. By hashing the join columns and redistributing the rows accordingly, matching column elements are redistributed to a common AMP, and the join operation may then be completed in parallel. For example, element $231_1$ of TableR.a has a value of "1", and element $232_{14}$ of Table 2.b has a value of "1". Because neither column a of TableR nor column b of TableS is the primary indexes by which the tables are originally distributed in the MPP system, the TableR row including the column value $231_1$ and the TableS row including the column value $232_{14}$ are originally distributed to AMP $210_1$ and $210_6$, respectively, as depicted in FIG. 2. By hashing the columns of the join statement and redistributing the tables according to the hashed elements, both the TableR row including the column value $231_1$ and the TableS row including the column value $232_{14}$ are redistributed to a common AMP, e.g., AMP $210_4$ as depicted in FIG. 3. After hash redistribution of the tables, the join operation may then be executed in parallel.

In conventional parallel DBMSs, rows are statically redistributed to processing modules based on a pre-configured hash value-to-processing module mapping table. Disadvantageously, rows are redistributed to processing modules solely on the hash value and regardless of the number of rows that are redistributed across the system.

In accordance with embodiments, a mechanism is implemented that attempts to maintain as many rows locally as possible when deciding which rows to be redistributed to processing modules when performing a parallel join operation. To this end, an intermediate level of row redistribution processing is introduced that dynamically maps hash values to processing modules for the execution of each individual query as described more fully hereinbelow.

For illustrative purposes, assume that there is a single AMP or other processing module per processing node, that two relations R and S are distributed on three processing nodes, and that there are 6000 rows on each processing node from each relation. FIG. 4 depicts a diagrammatic representation of an exemplary redistribution matrix 400, designated T. A matrix cell, $T_{ij}$, represents the number of rows to be hash redistributed from a node(i) to a node(j). Thus, for example, the second row in the matrix T indicates that the hash function requires the second node to redistribute 3000 rows to node 1 (represented by matrix cell $T_{21}$) and 2000 rows to node 3 (represented by matrix cell $T_{23}$) for both R and S. Note that cell $T_{22}$ (i.e., the second row, second column) indicates that 1000 rows are kept locally on node 2 for both R and S. The matrix T is referred to as the redistribution matrix for R and S.

The total number of rows to be redistributed in this example for both relations is computed by summing the table entries for all cells $T_{ij}$, where i≠j, according to the following:

Rows Redistributed=(2000+3000+3000+2000+2000+3000)*2=30,000.

In accordance with an embodiment, an optimized redistribution matrix, designated T', may be derived from the redistribution matrix T. FIG. 5 depicts a diagrammatic representation of an exemplary optimized redistribution matrix T' 500 generated in accordance with an embodiment. In the illustrative example, the optimized redistribution matrix, T', is derived from the redistribution matrix, T, depicted and described with reference to FIG. 4. Particularly, the optimized redistribution matrix, T', is generated by minimizing the number of rows required to be redistributed by maximizing the diagonal of the redistribution matrix, i.e., by maximizing the sum of $T'_{ij}$ where i=j. In the present example, the number of rows needed to be redistributed according to the optimized redistribution matrix T' is as follows:

Rows Redistributed=(1000+2000+2000+1000+1000+ 2000)*2=18,000

Thus, in the present example the optimized redistribution matrix provides for a redistribution of sixty percent of the number of rows needed to be redistributed according to the original redistribution matrix T. In this simplified example, the rows of both R and S are partitioned evenly before and after the redistribution.

Rows from R and S that would be redistributed to a common AMP or processing module must be redistributed to a common AMP or processing module according to the optimized redistribution matrix T' as well. However, the AMP or processing module to which a particular row is to be redistributed according to the optimized redistribution matrix T' does not have to correspond to the processing module or AMP that the row would be redistributed to according to the original redistribution matrix T.

The optimized redistribution matrix T' shown in FIG. 5 may be derived from the original redistribution matrix T shown in FIG. 4 by using a mapping function, g, as follows:

g(1)→2
g(2)→3
g(3)→1

The mapping function g(x)>(y) indicates that those rows that would originally be redistributed to processing module x according to the original redistribution matrix T are to be redistributed to node y according to the optimized redistribution matrix T'. Visually, the redistribution matrix T' is derived from the redistribution matrix T by permuting the columns in the matrix T according to the mapping function g. For example, the first column in the redistribution matrix T becomes the second column in the matrix T' according to the mapping function g(1)→2, the second column in the matrix T becomes the third column in matrix T' according to the mapping function g(2)→3, and the third column in matrix T becomes the first column in matrix T' according to the mapping function g(3)→1.

The optimized redistribution mechanism may also be applied in the case where one relation participating in the join operation has already been partitioned on its join attribute. For example, assume the relation S has been partitioned on S.b. The row redistribution matrix for S will only have non-zero values on its diagonal where each $T_{ii}$ is the number of rows of S on node(i). No rows of S are required to be redistributed because only the rows of R based on the hash value of R.a are require to be redistributed in order to join the relations R and S.

Assume there are n nodes in an MPP system such as that depicted in FIGS. 1 and 2 and that each node has m AMPs or processing modules. A hash function may be applied on rows from R and S on each AMP thereby generating a redistribution matrix X for R as described above where each cell $X_{ij}$ indicates that $X_{ij}$ rows from R would be sent from node(i) to node(j) according to the conventional redistribution mechanism. $X_{ij}$ can be defined as follows.

$X_{ij}=|\{Row^R_i|amp2node(hashamp(hashbucket(hashrow(Row^R_i)))=j\}|$ where
$Row^R_i$—Any row of R on node i
hashrow—Hash value of the join column of R
hashbucket—Hash bucket value
hashamp—AMP number that owns the hash bucket
amp2node—The number of the node where the AMP resides.

By definition, $X_{ij}$ is the number of all rows of R on all AMPs on node(i) that are hashed to any hash bucket that is mapped to any AMP that is on node(j). Similarly, a redistribution matrix Y is generated where each cell $Y_{ij}$ indicates that $Y_{ij}$ rows of S would be sent from node(i) to node(j) according to the conventional hash redistribution mechanism.

In this implementation, the hash redistribution matrix T comprises the sum of X and Y. The total number of rows of R and S that would be redistributed according to the hash redistribution matrix T across all nodes is as follows:

$$\sum_{i=1}^{n}\sum_{\substack{j=1 \\ j\ne i}}^{n} T_{ij} = \sum_{i=1}^{n}\sum_{j=1}^{n} T_{ij} - \sum_{i=1}^{n} T_{ii}$$

Thus, generation of the optimized redistribution matrix T' is essentially reduced to permuting the columns of the redistribution matrix T to maximize the sum of the diagonal of the permutation.

In accordance with an embodiment, an instance of the Hungarian algorithm may be invoked to identify a permutation of redistribution matrix T having a maximal diagonal sum among all possible matrix permutations thereby producing the optimized redistribution matrix T'.

Figure 6:
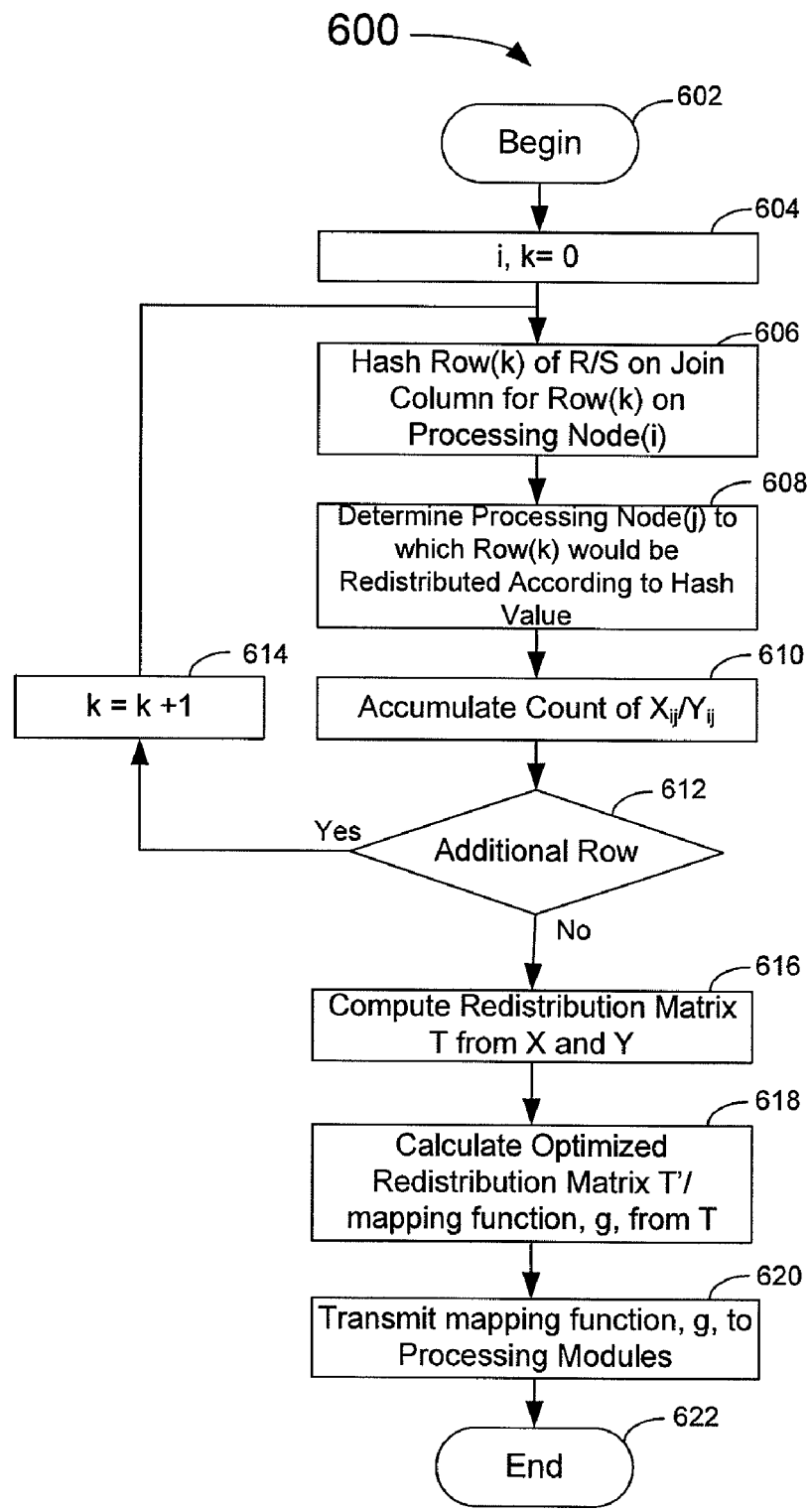
FIG. 6 is a flowchart that depicts processing of an optimized redistribution routine that facilitates the minimization of row redistribution for parallel join operations implemented in accordance with an embodiment.

FIG. 6 is a flowchart 600 that depicts processing of an optimized redistribution routine that facilitates the minimization of row redistribution for parallel join operations implemented in accordance with an embodiment. The processing steps of FIG. 6 may be implemented as computer-executable instructions tangibly embodied on a computer-readable medium executable by a processing system, such as the optimizer 122 depicted in FIG. 2.

The redistribution routine is invoked (step 602), and various counter or index variables may be initialized (step 604). In the illustrative example, a processing node index, i, and a row index, k, are initialized to zero. For a particular join operation, e.g., a join of relation R and relation S on join attributes R.a and S.b, a hash value of the join column R.a or S.b for a row(k) on processing node(i) is calculated (step 606). An evaluation is then made to determine to which processing node(j) the row(k) would be redistributed to according to the hash value (step 608). A redistribution matrix component $X_{ij}$ or $Y_{ij}$ is then incremented (step 610) to accumulate a count of rows that would be redistributed from processing node(i) to processing node(j). In the illustrative example, matrix X comprises a redistribution matrix for rows of the relation R, and matrix Y comprises a redistribution matrix for rows of the relation S. After the appropriate redistribution matrix component has been incremented, an evaluation may be made to determine if there remains additional rows of the processing node(i) to be evaluated (step 612). If so, the row index, k, may be incremented (step 614), and the row(k) is then hashed on the join attribute according to step 606.

A redistribution matrix, T, is then computed from the redistribution components $X_{ij}$ and $Y_{ij}$ (step 616), e.g., as a sum of X and Y. An optimized redistribution matrix, T', is then computed from the redistribution matrix T (step 618), e.g., by applying the Hungarian algorithm on the redistribution matrix T. A mapping function, g, may be calculated or otherwise derived from the optimized redistribution matrix T'. The mapping function, g, may then be transmitted to each of the processing modules (step 620). The optimized redistribution routine cycle may then end (step 622).

Figure 7:
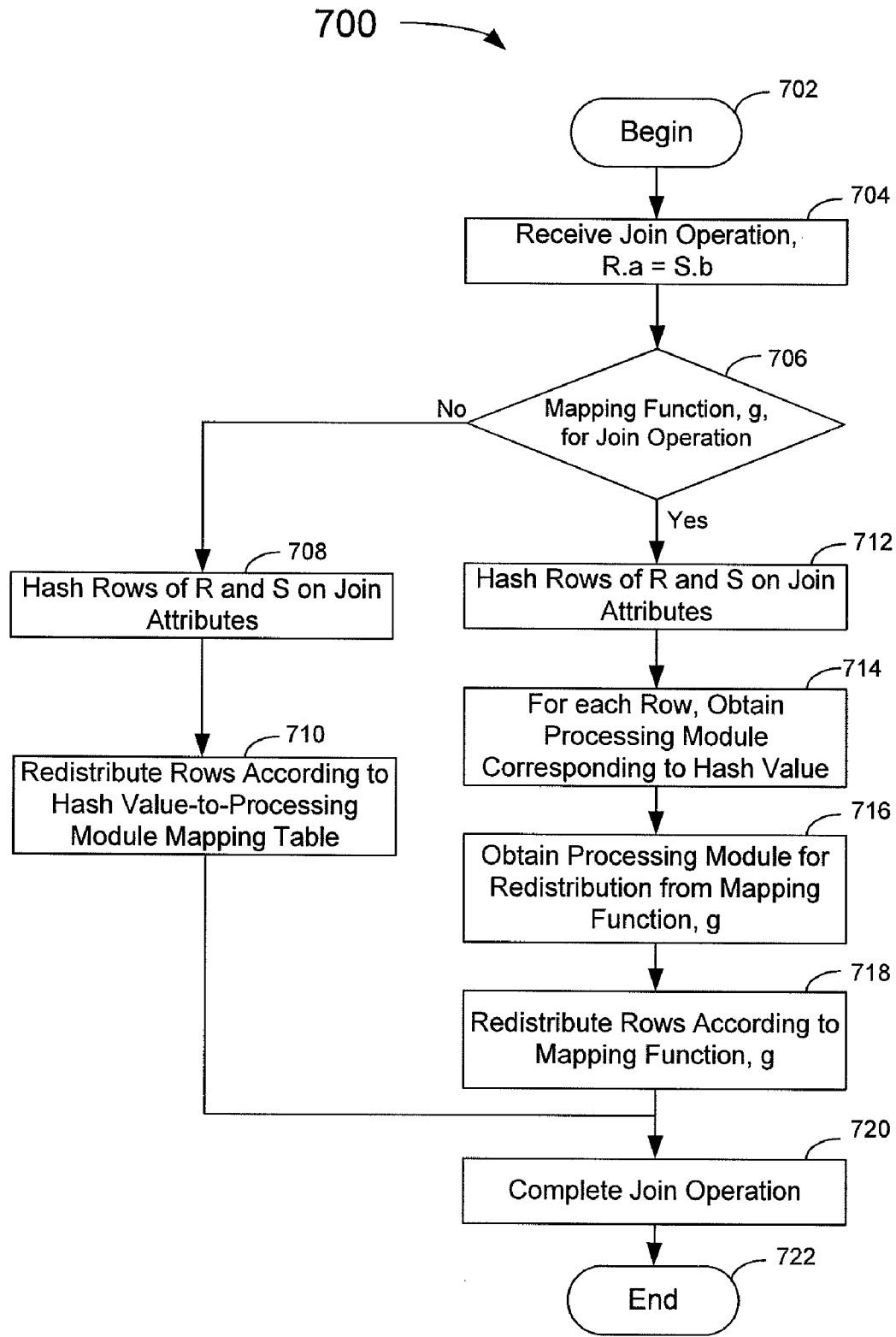
FIG. 7 is a flowchart that depicts processing of an optimized join routine that may be performed in accordance with an embodiment.

FIG. 7 is a flowchart 700 that depicts processing of an optimized join routine that may be performed in accordance with an embodiment. The processing steps of FIG. 7 may be implemented as computer-executable instructions tangibly embodied on a computer-readable medium executable by a processing system, such as each of the AMPs $210_1$-$210_9$ depicted in FIG. 2.

The join operation routine is invoked (step 702), and the processing module receives a join operation on attributes R.a and S.b of relations R and S (step 704). The processing module then evaluates whether a mapping function, g, is available for optimization of the join operation (step 706). If no mapping function, g, is available for the join operation, the processing module may then hash rows of R and S on the join attributes R.a and S.b (step 708) and redistribute the rows according to the hash values (step 710), e.g., according to a hash value-to-processing module mapping table. The join operation may then be completed (step 720).

Returning again to step 706, in the event that a mapping function, g, is available for the join operation, the processing module may then hash rows of relations R and S on the join attributes (step 712). For each row, the processing module may obtain a processing module from the hash value, e.g., by utilizing a conventional hash value-to-processing module mapping table (step 714). Rather than redistributing the row to the processing module obtained from the mapping table, the processing module then obtains a processing module from the mapping function, g, for optimization of the join operation (step 716), and redistributes the row according to the mapping function, g (step 718). The join operation may then be completed (step 720), and the optimized join operation routine cycle may then end (step 722).

In practice, several mechanisms may be employed to precompute the redistribution matrixes necessary for implementing the described optimized redistribution. For example, the redistribution matrixes may be implemented as part of the statistics utilized in the MPP system, and computation of redistribution matrixes may be piggybacked on other statistics building functions. Most modern optimizers have a feedback loop system which may analyze a query log to automatically collect statistics and may store information from actual query executions which may be used later by the system. It also uses information from actual query execution to improve and correct the estimates. For example, if the system detects that the row redistribution is high on a frequently used join, a determination may be made to decide to utilize the matrix optimization approach in a subsequent join.

The proposed optimized redistribution mechanisms may advantageously reduce the total communication costs encountered in parallel database management systems (PDBMs) thereby reduce query response times. As described, a method, computer-readable medium, and system for optimizing execution of a join operation in a parallel processing system are provided. A plurality of processing nodes that have at least one row of one or more tables involved in a join operation are identified. For each of the processing nodes, respective counts of rows that would be redistributed to each of the processing nodes based on join attributes of the rows are determined. A redistribution matrix is calculated from the counts of rows of each of the processing nodes. An optimized redistribution matrix is generated from the redistribution matrix, wherein the optimized redistribution matrix provides a minimization of rows to be redistributed among the nodes to execute the join operation.

The flowcharts of FIGS. 6-7 depict process serialization to facilitate an understanding of disclosed embodiments and are not necessarily indicative of the serialization of the operations being performed. In various embodiments, the processing steps described in FIGS. 6-7 may be performed in varying order, and one or more depicted steps may be performed in parallel with other steps. Additionally, execution of some processing steps of FIGS. 6-7 may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the disclosed embodiments may be implemented in software, hardware, firmware, or a combination thereof. The various elements of the system, either individually or in combination, may be implemented as a computer program product tangibly embodied in a machine-readable storage device for execution by a processing unit. Various steps of embodiments may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying aspects of the disclosed embodiments can be loaded onto a computer. The computer program is not limited to any particular embodiment, and may, for example, be implemented in an operating system, application program, foreground or background process, or any combination thereof, executing on a single processor or multiple processors. Additionally, various steps of embodiments may provide one or more data structures generated, produced, received, or otherwise implemented on a computer-readable medium, such as a memory.

Although disclosed embodiments have been illustrated in the accompanying drawings and described in the foregoing description, it will be understood that embodiments are not limited to the disclosed examples, but are capable of numerous rearrangements, modifications, and substitutions without departing from the disclosed embodiments as set forth and defined by the following claims. For example, the capabilities of the disclosed embodiments can be performed fully and/or partially by one or more of the blocks, modules, processors or memories. Also, these capabilities may be performed in the current manner or in a distributed manner and on, or via, any device able to provide and/or receive information. Still further, although depicted in a particular manner, a greater or lesser number of modules and connections can be utilized with the present disclosure in order to accomplish embodiments, to provide additional known features to present embodiments, and/or to make disclosed embodiments more efficient. Also, the information sent between various modules can be sent between the modules via at least one of a data network, an Internet Protocol network, a wireless source, and a wired source and via a plurality of protocols.

What is claimed is:

1. A method of optimizing execution of a join operation in a parallel processing system, comprising:
    identifying a plurality of processing nodes that have at least one row of one or more tables involved in a join operation;
    for each of the processing nodes, determining respective counts of rows that would be redistributed to each of the processing nodes based on join attributes of the rows;

calculating a redistribution matrix from the counts of rows of each of the processing nodes; and generating an optimized redistribution matrix from the redistribution matrix, wherein the optimized redistribution matrix provides a minimization of rows to be redistributed among the nodes to execute the join operation.

2. The method of claim 1, wherein the plurality of nodes comprise m nodes, and wherein determining respective counts comprises determining m counts for each of the nodes.

3. The method of claim 1, wherein determining respective counts of rows that would be redistributed comprises determining respective counts of rows that would be redistributed based on hash values of join attributes of the rows.

4. The method of claim 1, wherein the plurality of nodes comprises m nodes, wherein the redistribution matrix comprises m-by-m elements, and wherein an element $T_{ij}$ of the redistribution matrix specifies a count of rows that would be redistributed from a node(i) to a node(j) according to hash values of join attributes of the rows.

5. The method of claim 1, further comprising generating a mapping function from the optimized redistribution matrix.

6. The method of claim 5, further comprising transmitting the mapping function to the plurality of nodes.

7. The method of claim 6, further comprising:

calculating, by a processing node, a hash value of a join attribute of a row;

identifying a first processing node from the hash value and a hash value-to-processing module mapping table; and identifying a second processing node from the first processing node and the mapping function, wherein the processing node redistributes the row to the second processing node.

8. The method of claim 1, wherein generating an optimized redistribution matrix from the redistribution matrix comprises applying a Hungarian algorithm instance to the redistribution matrix.

9. A non-transitory computer-readable medium having computer-executable instructions for execution by a processing system, the computer-executable instructions for optimizing a join operation in a parallel processing system, the computer-executable instructions, when executed, cause the processing system to:

identify a plurality of processing nodes that have at least one row of one or more tables involved in a join operation;

for each of the processing nodes, determine respective counts of rows that would be redistributed to each of the processing nodes based on join attributes of the rows;

calculate a redistribution matrix from the counts of rows of each of the processing nodes; and generate an optimized redistribution matrix from the redistribution matrix, wherein the optimized redistribution matrix provides a minimization of rows to be redistributed among the nodes to execute the join operation.

10. The non-transitory computer-readable medium of claim 9, wherein the plurality of nodes comprise m nodes, and wherein the instructions that determine respective counts comprise instructions that determine m counts for each of the nodes.

11. The non-transitory computer-readable medium of claim 9, wherein the instructions that determine respective counts of rows that would be redistributed comprise instructions that determine respective counts of rows that would be redistributed based on hash values of join attributes of the rows.

12. The non-transitory computer-readable medium of claim 9, wherein the plurality of nodes comprises m nodes, wherein the redistribution matrix comprises m-by-m elements, and wherein an element Tij of the redistribution matrix specifies a count of rows that would be redistributed from a node(i) to a node(j) according to hash values of join attributes of the rows.

13. The non-transitory computer-readable medium of claim 9, further comprising instructions that, when executed, cause the processing system to generate a mapping function from the optimized redistribution matrix.

14. The non-transitory computer-readable medium of claim 13, further comprising instructions that, when executed, cause the processing system to transmit the mapping function to the plurality of nodes.

15. The non-transitory computer-readable medium of claim 14, further comprising instructions that, when executed, cause the processing system to: calculate, by a processing node, a hash value of a join attribute of a row; identify a first processing node from the hash value and a hash value-to-processing module mapping table; and identify a second processing node from the first processing node and the mapping function, wherein the processing node redistributes the row to the second processing node.

16. The non-transitory computer-readable medium of claim 9, wherein the instructions that generate an optimized redistribution matrix from the redistribution matrix comprise instructions that, when executed, apply a Hungarian algorithm instance to the redistribution matrix.

17. A database management system, comprising:

a plurality of processing nodes each including at least one respective processing module;

at least one storage device to which a respective set of rows of a first table and a second table involved in a join operation are allocated to each of the plurality of processing modules, wherein the join operation comprises a join on a column of the first table and a column of the second table; and an optimizer that identifies a plurality of processing nodes that have at least one row of one or more tables involved in the join operation, determines respective counts of rows that would be redistributed to each of the processing nodes based on join attributes of the rows for each of the processing nodes; calculates a redistribution matrix from the counts of rows of each of the processing nodes, and generates an optimized redistribution matrix from the redistribution matrix, wherein the optimized redistribution matrix provides a minimization of rows to be redistributed among the nodes to execute the join operation.

18. The system of claim 17, wherein the plurality of nodes comprise m nodes, and wherein determining respective counts comprises determining m counts for each of the nodes.

19. The system of claim 17, wherein the optimizer determines respective counts of rows that would be redistributed based on hash values of join attributes of the rows.

20. The system of claim 17, wherein the plurality of nodes comprises m nodes, wherein the redistribution matrix comprises m-by-m elements, and wherein an element $T_{ij}$ of the redistribution matrix specifies a count of rows that would be redistributed from a node(i) to a node(j) according to hash values of join attributes of the rows.

* * * * *